(12) United States Patent
Jiang et al.

(10) Patent No.: US 10,596,548 B2
(45) Date of Patent: Mar. 24, 2020

(54) METHOD FOR PREPARING SUPER ABSORBENT RESIN

(71) Applicant: Yuming Jiang, Xiamen (CN)

(72) Inventors: Yuming Jiang, Xiamen (CN); Yue Jiang, Xiamen (CN)

(73) Assignee: YUMING JIANG, Xiamen (CN)

( * ) Notice: Subject to any disclaimer, the term of this patent is extended or adjusted under 35 U.S.C. 154(b) by 95 days.

(21) Appl. No.: 15/925,789

(22) Filed: Mar. 20, 2018

(65) Prior Publication Data

US 2019/0070586 A1 Mar. 7, 2019

(30) Foreign Application Priority Data

Sep. 7, 2017 (CN) .......................... 2017 1 0798403

(51) Int. Cl.
| | |
|---|---|
| C08F 20/06 | (2006.01) |
| B01J 20/10 | (2006.01) |
| B01J 20/30 | (2006.01) |
| C08F 6/02 | (2006.01) |
| B01J 20/28 | (2006.01) |
| B01J 20/26 | (2006.01) |
| B01J 20/08 | (2006.01) |
| B01J 20/04 | (2006.01) |
| C08L 33/02 | (2006.01) |
| C08F 222/02 | (2006.01) |
| C08F 220/06 | (2006.01) |

(52) U.S. Cl.
CPC ......... *B01J 20/3085* (2013.01); *B01J 20/041* (2013.01); *B01J 20/08* (2013.01); *B01J 20/103* (2013.01); *B01J 20/261* (2013.01); *B01J 20/267* (2013.01); *B01J 20/28004* (2013.01); *B01J 20/28026* (2013.01); *B01J 20/3007* (2013.01); *B01J 20/3028* (2013.01); *C08F 220/06* (2013.01); *C08F 222/02* (2013.01); *C08L 33/02* (2013.01); *B01J 2220/68* (2013.01)

(58) Field of Classification Search
CPC ....... B01J 20/103; B01J 20/3085; C08K 3/36; C08F 6/02
USPC ...................................................... 526/317.1
See application file for complete search history.

(56) References Cited

U.S. PATENT DOCUMENTS

| | | | |
|---|---|---|---|
| 6,403,700 B1 * | 6/2002 | Dahmen | A61L 15/60 174/110 V |
| 7,981,833 B2 * | 7/2011 | Ikeuchi | C08J 3/245 502/400 |
| 2009/0298685 A1 * | 12/2009 | Torii | A61L 15/18 502/402 |

* cited by examiner

*Primary Examiner* — Vu A Nguyen
(74) *Attorney, Agent, or Firm* — Bayramoglu Law Offices LLC

(57) ABSTRACT

The present invention discloses a method for preparing a super absorbent resin including the following steps: 1) adding an inner-crosslinking agent, an active promoter, and an initiator to a solution of an unsaturated monomer in water, deoxygenating by bubbling nitrogen therethrough, and then undergoing free radical polymerization to obtain a gel; 2) reacting the gel with a neutralizing agent, extruding, and granulating to obtain a product; 3) drying, pulverizing, sieving, and fixing the particle size combination of the product to obtain powdered raw particles; 4) adding a surface crosslinking agent to the powdered raw particles and performing surface crosslinking by heating to obtained crosslinked particles; and 5) subjecting the crosslinked particles to anti-caking treatment to obtain a super absorbent resin.

6 Claims, 1 Drawing Sheet

METHOD FOR PREPARING SUPER ABSORBENT RESIN

CROSS REFERENCE TO RELATED APPLICATIONS

This application is based upon and claims priority to Chinese Patent Application No. 201710798403.9, filed on Sep. 7, 2017, the entire contents of which are incorporated herein by reference.

BACKGROUND

Technical Field

The present invention relates to the technical field of super absorbent resins, and particularly to a method for preparing an absorbent resin in the form of a microporous powder that is insoluble in water, can absorb water, urine, and blood, and has high liquid absorption speed, high liquid flow-through rate, low reverse osmosis of liquid absorbed, high pressure resistance, and high hydrolysis resistance. The super absorbent resin is applicable to hygiene products including sanitary napkins, paper diapers, and sanitary napkins.

Background of the Invention

Super absorbent resins are a new type of functional polymer materials with a three-dimensional network structure, which can absorb deionized water of hundreds to thousands of times their own weight and physiological saline of dozens of times their own weight, and swell and retain a non-flowing state after absorbing water. The super absorbent resins have a strong water retention ability, and the absorbed water is difficult to overflow under a certain pressure condition. The super absorbent resins have found wide use in the area of hygienic materials, for example, as an absorbent agent in baby diapers, adult incontinence products, feminine hygiene products, and medical mattresses, and in preservation applications for food preservation.

Depending on the raw materials for production, the super absorbent resins are classified into starch-based, cellulose-based, and synthetic resin-based super absorbent resins, as well as organic-inorganic composite super absorbent resins. Among them, the raw materials for the synthetic super absorbent resin mainly comprise polyacrylates and modified polyvinyl alcohols The polyacrylate-based super absorbent resins have excellent water absorption and retention performance, high heat resistance, and low cost, and are obviously advantageous over the starch- and cellulose-based super absorbent resins in post-processing, storage, transportation, and mold and mildew resistance in industrial production. Moreover, the acrylic acid is readily available, and the super absorbent resins prepared have high water absorption capacity and low production cost and are economically efficient, so they dominate the market. Most of the super absorbent resins currently used in hygiene products are polyacrylic acid super absorbent polymers. The polymerization methods include polymerization in casting film (Japanese Patent Publication No. 1973-42,466), polymerization in a grinding mill with a stirring blade (Japanese Patent Publication No. 1982-34,101), polymerization on a conveyor belt (Japanese Patent Publication No. 1983-49,714), inverse suspension polymerization (Japanese Patent Publication No. 1984-37,003) or polymerization by spraying or coating a monomer onto a fibrous substrate (Japanese Patent Publication No. 1987-53,309).

Since the 1980s, researches on super absorbent resins are started in China. The starting time is late relative to other countries, and there is still a gap in the technologies and products compared with the developed countries. At present, the global production capacity of super absorbent resins is mainly distributed in the United States, Japan, China, and some European countries. The manufacturers mainly include Evonik, Degussa and BASF from Germany, Nippon Shokubai, Sandaya, and Sumitomo Seika from Japan, which are highly concentrated in the industry. The products and technologies of the manufacturers from Japan, Germany, and the United States have always been at a leading position, and China is also blocked from the technologies and equipment. The vigorous development of hygienic materials has made China one of the world's leading producers of sanitary materials. In place of the traditional cotton blends, ultra-thin baby diapers with a unique core structure are creatively developed by some manufacturers in China. In the ultra-thin diapers, composite paper containing a super absorbent resin is used as a core, and the mixing ratio of fluff pulp to the super absorbent resin has changed from the original 3:1 to 2:1, whereby the products become thinner. Recently, ultra-thin diapers having a mixing ratio of 1:1 or less have also been developed. Therefore, higher requirements are imposed on the main material super absorbent resin. With the traditional safety requirement, faster liquid absorption rate, higher dry touch sensation, that is, lower reverse osmosis of liquid absorbed, and higher hydrolysis resistance are required. Therefore, the development of highly functional super absorbent resins is needed for market development, which is also a key support for the innovative research and development of hygienic materials with unique core structures by manufacturers in China.

On the whole, the methods for producing super absorbent resins and the super absorbent resin products disclosed in the prior art have the disadvantages of slow liquid absorption rate, severe reverse osmosis of liquid absorbed, and low dry touch sensation. This is because the existing super absorbent resin particles are mostly solid particles, and the liquid transfer rate between the particles is also insufficient, resulting in the slow absorption rate of the super absorbent resin powder during use.

The water absorption rate of the super absorbent resin is mostly considered according to the applications. It is expressed in the absorption rate for deionized water, or in the water absorption rate for 0.9% physiological saline. From the perspective of dynamics of elastic gel swelling, the water absorption rate of the super absorbent resin is closely related to the temperature and the degree of cross-linking degree, and also depends on the surface structure. The absorption rate increases with increasing specific surface area. Generally, the liquid absorption rate of the product can be improved by reducing the particle size of the product to increase the specific surface area. However, this method has many drawbacks. Within a certain range, the smaller particle size can lead to an increased liquid absorption rate of the product. This is because in the case of a large particle size of the resin, the distance that the water penetrates into the resin from the surface of the resin is long, so the contractibility of the polymer network is relatively increased. However, the polymer chain cannot be fully extended, resulting in a lower water (liquid) absorbency compared with the case of a small particle size. However, with a too fine particle size, "agglomerated particles" like dough trends to be formed in water, which increases the absorption resistance. That is, the outer surface has already swollen through water absorption while the interior is still a dry powder. This reduces the water absorption rate. Moreover, in practical applications, a too fine super absorbent resin may escape from the absorbent paper surface layer of the paper diapers, and is adhered to the surface layer of the diapers after the liquid adsorption and swelling, causing a very poor skin-friendly performance. From the perspective of dynamics of elastic gel swelling, the degree of cross-linking of the super absorbent resin also has an impact on the absorption rate. For the raw particles obtained after the same polymerization, drying, pulverization, sieving, and particle size combination fixing processes, if a lower degree of secondary surface cross-linking is adopted, the liquid absorption rate of the product is increased. This is because the contractibility of the polymer network is relatively increased due to the reduced crosslinked points in the three-dimensional grid of the resin, so that the polymer chain can be more easily extended. However, the reduced crosslinked points in the three-dimensional grid of the resin cause a reduced gel strength and thus a significantly reduced water retention capacity under pressure of the resin. The decrease in the gel strength may also lead to the formation of "agglomerated particles" due to the adhesion between the particles, thus increasing the absorption resistance, since the outer surface has swollen from water absorption while the interior is still a dry powder. Moreover, the decrease in the gel strength also leads to exacerbated reverse osmosis under pressure of the liquid absorbed. In practical applications, the exacerbated reverse osmosis of the diaper after the liquid absorption causes a poor dry touch sensation of the diaper. A product of good overall performances can be obtained only with suitable particle size range, reasonable combination and fixation of different particle sizes, and proper degree of cross-linking.

In summary, to improve the liquid absorption rate of and reduce the reverse osmosis of the liquid absorbed from the super absorbent resin, it is necessary to change the structure of the existing super absorbent resin, including the physical structure and the chemical structure. Changing the physical structure is to increase the surface area of the particles generated during the production or processing of the resin as large as possible. However, increasing the surface area of the particles does not means to simply reduce the particle size, but is to form a porous structure inside the resin particles. Changing the chemical structure is to change the chemical composition of the resin by changing the type of the monomer or by adding a component. Such a composition needs to be conducive to the increase in the water absorption rate of the resin, and the residual free water is less after the water absorption by the resin, so as to improve the dry touch sensation of the resin after water absorption. This is particularly important for use as a hygienic material.

In order to increase the absorption rate and overcome the shortage of slow water absorption rate, the introduction of a porous structure is one of the methods to solve this defect. As disclosed in existing patent documents, a surfactant is used as a foaming agent to prepare a porous absorbent guar-poly(sodium acrylate-styrene)/attapulgite gel having increased water absorption capacity. However, the gel prepared through this method necessitates post-treatment with methanol and water, in which a large amount of solvent is needed, causing pollution to the environment. A porous super absorbent P(AA-co-AM) resin is prepared by using sodium bicarbonate as a foaming agent and sodium dodecyl benzenesulfonate (SDBS) as stabilizer. The method has the advantages of convenient operations, simple process, and being environmentally friendly. However, the resin prepared through this method has fewer pore structures, and the pore structures are present on the surface, so no obvious increase in water absorption rate is achieved. A porous polypotassium acrylate/kaolin composite material having good water absorption capacity is prepared by using sodium bicarbonate and acetone as a pore forming agent. However, in this method, acetone is used as a pore forming agent, which is unsafe and cause the pollution of environment.

In addition, the secondary surface cross-linking treatment is also an important factor. Since the super absorbent polymer is a water-insoluble hydrophilic polymer, a uniform crosslinked structure is generally present inside the resin. For improving the quality of the super absorbent resin, further cross-linking treatment is performed on the surface of the resin after sieving and fixing the particle size, to improve the physical properties such as gel strength, anti-caking property and liquid permeability. In this surface cross-linking treatment, a multi-functional cross-linking agent able to react with the carboxyl groups is employed. The surface cross-linking treatment has been proposed in many patents at present, for example, surface cross-linking treatment by dispersing the super absorbent resin and a crosslinking agent in an organic solvent (JP-A-56-131608, JP-A-57-44627, JP-A-58-42602, and JP-A58-117222), treatment by directly mixing a cross-linking agent and a cross-linking agent solution into the super absorbent resin by using an inorganic powder (JP-A60-163956, and JP-A-60-255814), treatment by adding a cross-linking agent and then evaporating (JP-A-1-113406), surface cross-linking treatment with an organic solvent, water and a polyol (JP-A-63-270741, JP-A-64-50707, JP-A-1-292004), and surface cross-linking treatment with an organic solvent, water and an ether compound (JP-A-2-153903). Although these surface treatment methods can increase the absorption rate or increase the water absorbency under pressure of the resin, they cause the adverse consequences of excessive decrease in the retention capacity, thus reducing the performance in the practical application.

SUMMARY OF THE INVENTION

An object of the present invention is to provide a method for preparing a super absorbent resin.

To achieve the above object, the following technical solutions are adopted in the present invention.

A method for preparing a super absorbent resin is provided, which comprises the steps of:

1) adding an inner-crosslinking agent, an active promoter, and an initiator to a solution of an unsaturated monomer in water, deoxygenating by bubbling nitrogen therethrough, and then undergoing free radical polymerization, to obtain a gel, wherein the unsaturated monomer is the acrylic acid monomer and/or a water-soluble monomer with an unsaturated double bond having an acidic group 2) reacting the gel obtained in Step 1) with a neutralizing agent, extruding, and granulating, to obtain a product;

3) drying, pulverizing, sieving, and fixing the particle size combination of the product obtained in Step 2), to obtain powdered raw particles;

4) adding a surface crosslinking agent to the powdered raw particles obtained in Step 3) and performing surface crosslinking by heating, to obtained crosslinked particles; and 5) subjecting the crosslinked particles obtained in Step 4) to anti-caking treatment, to obtain a super absorbent resin.

Further, in Step 1), the unsaturated monomer is the acrylic acid monomer.

Further, in Step 1), the water-soluble monomer with an unsaturated double bond having an acidic group is methacrylic acid, maleic acid, or fumaric acid. In addition, other hydrophilic monomers having an unsaturated double bond may also be optionally added in an amount that does not destroy the physical properties of the super absorbent resin, such as acrylamide, methacrylamide, methyl acrylate, ethyl acrylate, 2-carboxyethyl acrylate, and 2-carboxyethyl methacrylate.

Further, in Step 1), the solution of the unsaturated monomer in water has a concentration of 25-35 wt %. When the concentration is less than 25 wt %, the gel is too soft and viscous, which is unfavorable for mechanical processing. When the concentration is more than 35 wt %, the reaction is too fast and the reaction heat is too much, so the reaction is difficult to control.

Further, in Step 1), the free radical polymerization is initiated at −3-5° C.

Further, in Step 1), the inner-crosslinking agent is a compound having two or more unsaturated double bonds and/or a compound having two or more epoxy groups. Examples include trimethylolpropane triacrylate, a diacrylate, a polyacrylate, a dimethacrylate, a polymethacrylate, ethylene glycol diacrylate, polyethylene glycol diacrylate, ethylene glycol dimethacrylate, polyethylene glycol dimethacrylate, glycidyl acrylate, glycidyl methacrylate, a trimethacrylate, a triacrylate, a trimethacrylate, N,N'-methylene-bisacrylamide, N'-methylol acrylamide, polyethylene glycol ether, polyethylene glycol monoallyl ether, pentaerythrityl triallyl ether, sorbitol polyglycidyl ether, polyglycerol glycidyl ether, ethylene glycol diglycidyl ether, and diethylene glycol diglycidyl ether. Preferably, in Step 1), the inner-crosslinking agent is added in an amount of 0.001-5 wt % based on exclusively the acrylic acid monomer in the solution of acrylic acid in water. The addition of the inner-crosslinking agent allows the resulting super absorbent resin to have an appropriate degree of crosslinking, and a suitable processability. When the amount added is less than 0.001 wt %, the resulting super absorbent resin is too soft and viscous, which is unfavorable for mechanical processing. When the amount added is more than 5 wt %, the water absorption capacity of the super absorbent resin is too low, thus deteriorating the performance of the resin.

Further, in Step 1), the active promoter is one of a fatty acid ester, a fatty acid salt, and an alkyl sulfonate salt, or a mixture thereof.

Further, in Step 1), the initiator is a mixture of a redox initiator and a thermally decomposable initiator. When initiated, the redox initiator reacts first to generate free radicals. When the free radicals are transferred to the carboxyl-containing monomer, the polymerization reaction is immediately initiated. A large amount of heat is released during the free radical polymerization reaction, so the temperature rises. When the temperature reaches the decomposition temperature of the thermally decomposable initiator, the decomposition of the thermally decomposable initiator is initiated in the second stage, such that the entire polymerization reaction trends to be complete. Preferably, the redox initiator is an acidic sulfite, a thiosulfate, ascorbic acid, or a ferrous salt; and the thermally decomposable initiator is a peroxide or a water soluble azo compound. The peroxide is hydrogen peroxide, a phthalimide peroxide, a persulfate, ammonium persulfate, and an alkali metal persulfate. The water soluble azo compound is 2,2'-azobis(2-amidinopropane) dihydrochloride, 2,2'-azodiisobutylamidine dihydrochloride, 2,2'-azobis(N,N'-dimethyleneisobutylamidine) dihydrochloride, and 2,2-azo[2-methyl-N-(2-hydroxyethyl)] propenamine. Preferably, in Step 1), the initiator is added in an amount of 0.001-10 wt % based on exclusively the acrylic acid monomer in the solution of acrylic acid in water. When the amount added is less than 0.001 wt %, the reaction is too slow, and not economically efficient; and when the amount added is more than 10 wt %, the reaction is too fast and the reaction heat is not easy to control.

Further, Step 1), a neutralizing agent may also be added in an amount of 0-5 mol % based on exclusively the acrylic acid monomer in the solution of acrylic acid in water.

The free radical polymerization in Step 1) is a batch reaction in a closed reactor and includes induction and initiation, polymerization, and an aging process of more than 6 hours. In the reactor, the materials are uniformly mixed, the heat of reaction is evenly distributed, the temperature rise and temperature during the polymerization are effectively monitored, and the long aging process allows full chain propagation, such that a uniform product with a large molecular weight is obtained. The present invention is distinguished from such explosive polymerization or rapid polymerization as polymerization in casting film, polymerization in a grinding mill with a stirring blade, polymerization on a conveyor belt, or polymerization by spraying or coating a monomer onto a fibrous substrate, since the products obtained therefrom have a wide molecular weight distribution mixing with many small molecular weights. Also, unlike the inverse suspension polymerization, the present invention provides a unique mode of polymerization. The resulting gel may be first broken up by, for example, a breaker to give a gel having a diameter of 20 mm or less, and then neutralized.

Further, in Steps 1) and 2), the neutralizing agent is an alkali hydroxide or carbonate. Preferably, the neutralizing agent is sodium hydroxide, potassium hydroxide, sodium carbonate, potassium carbonate, sodium bicarbonate, or potassium bicarbonate.

Further, in Step 2), the neutralizing agent is added in such an amount that the degree of neutralization is 50-80 mol % and the concentration is 30-55 wt % based on exclusively the acrylic acid monomer in the solution of acrylic acid in water. The carboxyl groups on the polyacrylic acid are partly neutralized into, for example, a sodium salt or potassium salt by the neutralizing agent, to control the pH (that is, alkalinity-acidity) of the end product, such that the end product is neutral or slightly acidic. When the degree of neutralization is less than 50 mol %, the pH of the end product is lower; and when the degree of neutralization is more than 80 mol %, the pH of the end product is higher.

Further, in Step 3), the drying occurs at 13-300° C. When drying, the drying temperature is conveniently adjusted depending on the moisture content in the material. When the drying temperature is lower than 130° C., the drying time is too long, which is not economical; and when the drying temperature is higher than 300° C., the inner-crosslinking agent previously provided therein is amenable to crosslinking earlier, resulting in a reduced absorption capacity due to the high degree of crosslinking.

Further, in Step 3), the particle size distribution after sieving is 100-800 μm, and preferably 150-710 μm; the average particle size of the powdered raw particles obtained after fixing the combination is 300-450 μm; and the bulk density is 0.55-0.63 g/mL. A narrower particle size distribution is preferable. When the particle size after sieving is below 100 μm, the fine powder will increase the dust content in the end product; and when the particle size after sieving is above 800 μm, the particles will cause a decreased water absorption rate of the end product.

Further, in Step 4), the surface crosslinking agent is one of a compound having two or more epoxy groups, a polyol, and a polyamine, or a mixture thereof. The surface cross-linking agent is added in an amount of 0.001-10 wt % and preferably 0.005-5 wt % of the powered raw particles. When the amount of the surface crosslinking agent added is less than 0.001 wt %, no crosslinking effect is exhibited; and when the amount is more than 10 wt %, the water absorption capacity is reduced, thus deteriorating the resin performance. The surface cross-linking agent may be added directly, or added by formulating it into an aqueous solution, or into a solution in an aqueous hydrophilic organic solvent. The compound having two or more epoxy groups includes, for example, ethylene glycol diglycidyl ether, sorbitol polyglycidyl ether, polyglycerol glycidyl ether, diethylene glycol diglycidyl ether, polyethylene glycol diglycidyl ether, and diglycerol polyglycidyl ether. The polyol includes, for example, glycerol, propylene glycol, ethylene glycol, diethylene glycol, triethylene glycol, polyethylene glycol, 1,4-butylene glycol, trimethylolpropane, and sorbitol. The polyamine includes, for example, ethylenediamine, diethylenediamine, triethylenediamine, and polyethylenediamine. Considering that these amines are moderately toxic, they are not recommended for use in hygienic products and are only suitable for use with super absorbent resins for cables, rubbers, and other purposes.

Further, in Step 4), the heating temperature is 90-180° C. and preferably 125-150° C., and the heating time is 10-40 min. The heating enables the cross-linking reaction to proceed uniformly and rapidly with the surface cross-linking agent, thereby further achieving the effects of the present invention. When the heating temperature is lower than 90° C., the cross-linking reaction time is too long, which is not economical. When the heating temperature is higher than 180° C., the resin is prone to deterioration and thus the quality is affected. The heating temperature can be adjusted according to the effect of surface treatment to be obtained. The means for performing the heat treatment is, for example, a disc dryer, a heating furnace, a tunnel dryer, a drum dryer, a platform dryer, or a fluidized bed dryer.

Further, in Step 5), the anti-caking treatment comprises adding a water-insoluble fine powder to the crosslinked particles, and then adding a hydroxyl-rich nano-adhesive, so that the water-insoluble fine powder is adhered to the surface of the crosslinked particles.

Further, the water-insoluble fine powder is one of aluminium sodium sulfate, silica, alumina, and magnesia, or a mixture thereof. The water-insoluble fine powder is added in an amount of 0.001-10.0 wt % and preferably 0.01-4.0 wt % based on the total solid content of the crosslinked particles.

Further, the nano-adhesive is fumed silica. The nano-adhesive is added in an amount of 0.1-10 wt % and preferably 0.1-0.5 wt % based on the total solid content of the crosslinked particles. When the amount of the adhesive added is less than 0.1 wt %, the water-insoluble fine powder cannot be fully adhered to the surface of the crosslinked particles. When the amount of the adhesive added is more than 10 wt %, the super absorbent resin is caused to have a too low water absorption capacity, so the resin performance is deteriorated.

The anti-caking treatment serves to increase the voids between the super absorbent resin particles, so that the super absorbent resin is still highly flowable after absorbing moisture. The microporous structure of the absorbent resin particles and the increased voids between the particles allow the super absorbent resin particles to have a high liquid flow-through rate, such that the super absorbent resin can have a better liquid diffusion performance at the time of absorbing a liquid, and thus the overall liquid absorption capacity is higher.

The Present Invention has the Following Advantages.

1. The method of the present invention is a method for producing a super absorbent resin through bulk polymerization of an acid in an aqueous solution and neutralization. The present method is a post-neutralization method, in which the solution of the acrylic acid monomer in water is polymerized first, and then a neutralization step is performed, and which is different from the pre-neutralization method in the prior art in which the solution of the acrylic acid monomer in water is adjusted with a neutralizing agent to form a mixture of sodium acrylate and acrylic acid having the same degree of neutralization with the product before the polymerization is initiated. In the present method, an active promoter is employed to change the tonicity of the aqueous solution; a porous structure is formed by fixing the bubbles generated through deoxygenation with nitrogen in the gel during the polymerization process; and the small pores generated from the moisture escaped from the gel due to evaporation during the subsequent drying process are also quickly fixed. The presence of the porous structure leads to a decreased bulk density of the super absorbent resin of the present invention, and increases the specific surface area of the resin and the contact area with water, thereby improving the water absorbency of the super absorbent resin on the one hand. On the other hand, the porous structure also creates a channel for water to enter the interior of the polymer, and then water is absorbed by capillary action. This allows for a faster water absorption rate than a non-porous super absorbent resin that absorbs water through diffusion from the surface to the interior, thereby increasing the liquid absorption rate of the super absorbent resin.

2. The super absorbent resin produced in the present invention is a powder having a microporous structure, which is insoluble in water, can absorb water, urine, and blood, and has high liquid absorption speed, high liquid flow-through rate, low reverse osmosis of liquid absorbed, high pressure resistance, high dry touch sensation and high hydrolysis resistance.

BRIEF DESCRIPTION OF THE DRAWINGS

The specific embodiments of the present invention will be further described in detail with reference to the accompanying drawings.

DETAILED DESCRIPTION OF THE INVENTION

Figure 1:
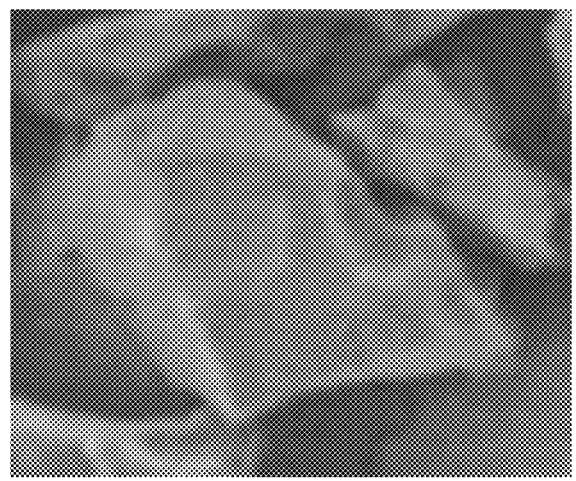
FIG. 1 is a photograph of an existing super absorbent resin under a high power microscope.

In order to make the present invention clearer, the present invention will be further described below in conjunction with the preferred embodiments. It should be understood by those skilled in the art that the following detailed description is illustrative rather than restrictive, and should not be construed as limiting the protection scope of the present invention.

Performance Test Standards

The performance indices of the super absorbent resin are tested following the steps as described in the method in China national standard GB/T 22905-2008 Super absorbent resin for diaper and in European Disposables and Nonwovens Association EDANA442.2-2002, as well as in beyond-standard methods generally accepted in the industry, referred to here as the market methods.

The absorption capacity, that is, the absorbency and water retention capacity, are tested following the steps as described in the tea bag test method in GB/T 22905-2008 Super absorbent resin for diaper, and EDANA442.2-2002 Determination of the absorbency and water retention capacity of super absorbent resins. Five measurements are made, and then averaged after removing the maximum and minimum values. The test steps are as follows. 1.0 g (accurate to 0.002 g) of the super absorbent resin is weighed into a tea bag, and soaked for 60 min in a 0.9% aqueous NaCl solution at 25±5° C. Then, the soaked tea bag is gently pulled out, suspended from a clip, stood for 15 min to allow for the dripping of water, and then weighed. The absorbency is obtained by subtracting the weight of the blank tea bag without the super absorbent resin from the value obtained, and then dividing by the weight of the super absorbent resin before soaking. The tea bag that has completed the determination of absorbency is placed in a centrifuge and centrifuged for 90 s at 150 G, and weighed. The water retention capacity after centrifugation is obtained by subtracting the weight of the wet empty tea bag after centrifugation from the value obtained, and then dividing by the weight of the super absorbent resin before soaking.

The high pressure resistance is expressed as the water absorbency under pressure, and determined following the steps as described in the method in GB/T 22905-2008 Super absorbent resin for diaper and EDANA442.2-2002 Super absorbent resin-determination of absorbency under pressure. The pressure load is 0.3 PSI (that is, 2068 Pa or 21.099 g/cm$^2$), and then further increased to 0.6 PSI (that is, 4137 Pa or 42.197 g/cm$^2$), and 0.9 PSI (that is, 6206 KPa or 63.296 g/cm$^2$) for determination. The determination steps are as follows. 0.160 g (accurate to 0.001 g) of the super absorbent resin powder is accurately weighed into a cylindrical body with a screen bottom, and a pressure of 0.3 PSI, 0.6 PSI, and 0.9 PSI is respectively applied to the powder. Then, the cylindrical body is placed on an absorbency tester, and the super absorbent resin powder is allowed to absorb a 0.9 wt % aqueous NaCl solution for 1 hr. The absorbency under pressure is obtained by dividing the weight value obtained after the water absorption by the weight of the super absorbent resin powder. and then the value obtained by measuring the water absorption weight is divided by the weight of the high water-absorbent resin powder The liquid absorption rate is expressed as absorption capacity within a fixed time interval, which is tested according to GB/T 22905-2008 Super absorbent resin for diaper and EDANA442.2-2002 Vortex method, and market method generally accepted in the industry.

The vortex method may be made reference to the method as described in GB/T 22905-2008 Super absorbent resin for diaper and EDANA442.2-2002 Determination of absorption rate of super absorbent resin. The absorption rate of the super absorbent resin is preferably determined at a temperature of (25±2) ° C. with a relative humidity of (45±10)%. The super absorbent resin sample was quickly added to a 0.9% NaCl solution of known volume with stirring, and then a gel is formed after the saline solution is absorbed by the SAP sample. The time from when the SAP was added to the time when a liquid gel is formed, the vortex generated by stirring disappears, and finally the gel surface becomes smooth is recorded. (50.0±1.0) ml of a 0.9% NaCl solution is measured into a 100 ml beaker. A rotor is placed and the NaCl solution is stirred on a magnetic stirrer at 600 rpm. (2.000±0.001) g of super absorbent resin is weighed on weigh paper and poured into the vortex in one portion. After addition, timing is started. As the sample absorbs saline, the vortex in the middle portion begins to disappear. The vortex is disappeared and the liquid level becomes planar. This is used as an endpoint, and the time required to reach the end point is measured in seconds. Three parallel tests are performed for each sample.

In the market method generally accepted in the industry, 0.9 wt % saline is used for testing the absorption capacity within a fixed time interval. The test steps are as follows. 1.0 g (accurate to 0.002 g) of the sample is weighed. All the sample is poured into the bottom of the tea bag. The sample attached to the inner side of the tea bag should also be poured into the bottom of the tea bag. The tea bag is soaked in 0.9% saline adjusted to a temperature of 25±0.5° C. Timing is started when the tea bag is soaked. The tea bag is slightly shaken up and down for 10 times in the saline to disperse the sample. At 1 min, 3 min, and 5 min after soaking, the soaked tea bag is lifted from the saline and hung on a drip rack until no water is dripped from the tea bag. The tea bag is weighed. A value is obtained by subtracting a blank weight from the weight of the tea bag obtained after the tea bag is completely soaked in saline, and hung until no water is dripped off from the tea bag, and recorded. Two replicates are set for each sample.

In the market method generally accepted in the industry, pure water is used for testing the absorption capacity within a fixed time interval. The method comprises the following test steps. 1.0 g (accurate to 0.002 g) of the sample is weighed. All the sample is poured into the bottom of a tea bag (18 mm×25 mm), and then opening of the tea bag is tied tightly. Then, the tea bag is soaked in pure water adjusted to a temperature of 25±0.5° C., and shaken gently three times up and down, and seven times left and right. Timing is started while soaking. At 1 min, 3 min, and 5 min after soaking, the soaked tea bag is lifted from the pure water and hung on a drip rack until no water is dripped from the tea bag. The tea bag is weighed. A value is obtained by subtracting a blank weight from the weight of the tea bag obtained after the tea bag is completely soaked in saline, and hung until no water is dripped off from the tea bag, and recorded. Two replicates are set for each sample.

The apparent density of the super absorbent resin is determined by using a densimeter following the method as described in GB/T 22905-2008 Super absorbent resin for diaper and EDANA442.2-2002. Before being removed for testing, the sample needs to be stored in a closed container that reaches equilibrium with the test temperature in the laboratory. The recommended test conditions are a temperature of (25±2°) C. and a relative humidity of (50±10)%.

The average particle size is determined according to the method described in GB/T 22905-2008 Super absorbent resin for diaper and EDANA 442.2-2002. The determination method is as follows. A series of standard sieves and logarithmic probability paper are used. The particle size (mesh size, μm) is set as the horizontal axis, and the cumulative mass % on the sieve is is set to the right vertical axis. Each point is connected with a straight line, and the particle size (μm) on the horizontal axis corresponding to 50% on the right vertical axis is the average particle size of the sample.

The particle size distribution is determined following the steps as described in GB/T 22905-2008 Super absorbent resin for diaper and EDANA442.2-2002 Determination of the particle size distribution of super absorbent resin. The super absorbent resin of different particle sizes is separated by using a series of standard sieves, and weighed separately. The mass percentages of the high-absorbent resin at various levels are calculated, to obtain the particle size distribution of the super absorbent resin.

The flow-through rate of saline is a rate at which the saline passes through a gel layer under pressure after the super absorbent resin absorbs the saline and swells to form the gel layer. 0.320±0.005 g of the super absorbent resin sample is weighed, and transferred to a 250 ml beaker. 150 ml of saline is added, stirred for 1 min at 120±20 rpm (that is, two rounds per second), and then stood for 30 min at room temperature, to allow the SAP sample to swell fully. Into a chromatographic separation tube, saline is added to above the 60 ml mark, and then the time required for the liquid to drop from the 60 ml mark to the 40 ml mark is determined. This time is set as T0 seconds. The swollen gel is poured into the chromatographic separation tube, and the beaker previously holding the gel is directly positioned beneath the chromatographic separation tube. The piston is opened to discharge the gas so that the liquid level in the chromatographic separation tube drops to 5 cm above the 60 ml mark. At this point, the gel washed off by the saline in the beaker is poured into the chromatographic separation tube. Be sure to pour all the gel into the chromatographic separation tube. After 1 minute, the piston was opened, and the time required for the liquid in the tube to drop from the 60 ml mark (upper mark) to the 40 ml mark (lower mark) is measured with a stopwatch. This time was set as T1 seconds. The liquid flow-through rate is calculated according to the following formula:

Liquid flow-through rate (ml/min)=20×60/($T1-T0$)

Two measurements are performed at the same time, and the arithmetic average is taken as the measurement result. The result is rounded off to an integer. Two measurements are performed with the swollen gel. If the results of the two measurements are highly different, the measurement is repeated.

Dry touch sensation: the amount of reverse osmosis within a fixed time interval after the super absorbent resin absorbs a liquid is determined according to a market method generally accepted in industry. The determination of the amount of reversely osmosed liquid absorbed can be determined based on the amount of the reversely osmosed liquid transferred to filter paper under pressure. The test steps are as follows. 2.0 g (accurate to 0.002 g) of a sample is weighed. The sample is poured into a 90 mm petri dish (upper lid), 50 ml of 0.9% saline is slowly added, and timing is started when it is poured. When the saline is added, the petri dish (upper lid) is slowly and equally rotated, to distribute the sample evenly. After 5 min, ten pieces of 90 mm filter paper that have been weighed (ml) are placed on the sample, on which a 90 mm Petri dish (base plate) equipped with a 300 g balance weight is pressed. The weight of the filter paper is exactly weighed at 0.5, 1, 2, 4, 8, 12, 16, 20, and 24 hrs from the starting time, from which the weight of the blank filter paper is subtracted.

The hydrolysis resistance is expressed as the extractable content, and determined following the method as described in GB/T 22905-2008 Super absorbent resin for diaper and EDANA442.2-2002 Super absorbent resin—determination of extractable content. The steps are as follows. 200 ml of saline is accurately measured, and poured into a 250 ml beaker. A stirring rod is added. 1 g (accurate to 0.001 g) of the super absorbent resin is weighed and poured into the beaker. The beaker is sealed with a paraffine film, and the magnetic stirrer is started to stir at 500 rpm for 16 hrs. 200 ml of saline is used as a blank control. After 16 hrs, the stirring is stopped, the gel is deposited, and the supernatant is filtered out using a Buchner funnel with filter paper. Not less than 50 ml of the liquid is left for test. 50 ml of the liquid is titrated with a standard NaOH solution until the pH is 10.0, as measured with a pH meter. The volume of NaOH solution consumed is recorded. Then, the liquid is titrated with a HCl solution until the pH is 2.7. The volume of the HCl solution consumed is recorded. At the same time, the blank solution is titrated.

Calculation of Results

1) The total amount of carboxylic acid (e.g. polycarboxylic acid), $n_{COOH}$ expressed as moles in the filtrate is calculated by a formula below:

$$n_{COOH}=(V_{NaOH,s}-V_{NaOH,b})c_{NaOH}$$

in which:

$V_{NaOH,s}$—volume (unit: mL) of the sodium hydroxide solution needed for titrating the filtered sample supernatant to pH 10.0;

$V_{NaOH,b}$—volume (unit: mL) of the sodium hydroxide solution needed for titrating the filtered blank solution to pH 10.0; and $c_{NaOH}$—concentration (unit: mol/L) of the sodium hydroxide solution.

2) The total content of carboxylate $n_{tot}$ expressed as moles in the filtrate is calculated by a formula below:

$$n_{tot}=(V_{HCl,s}-V_{HCl,b})c_{HCl}$$

in which:

$V_{HCl,s}$—volume (unit: mL) of the hydrochloric acid solution needed for titrating the sample filtrate from pH 10 to pH 2.7;

$V_{HCl,b}$—volume (unit: mL) of the hydrochloric acid solution needed for titrating the blank solution from pH 10 to pH 2.7; and $c_{HCl}$—concentration (unit: mol/L) of the hydrochloric acid solution.

3) The total amount of carboxylic acid neutralized in the filtrate $n_{COONa}$ expressed as moles is calculated by a formula below:

$$n_{cooNa}=n_{tot}-n_{COOH}$$

4) Weight of the carboxylic acid $m_{COOH}$ expressed in g, is calculated by a formula below:

$$m_{COOH}=n_{COOH} \times m_{COOH} \times F_{dil}$$

$$m_{COONa}=n_{COONa} \times m_{COONa} \times F_{dil}$$

in which:

$m_{COOH}$—molar mass of acrylic acid, that is, 72.0 g/mol;

$m_{COONa}$—molar mass of sodium acrylate, that is, 94.0 g/mol;

$F_{dil}$—dilution factor, that is, 200/50=4.

5) The extractable content w expressed in percent by weight in the super absorbent resin is calculated by a formula below:

$$w = \frac{m_{COOH} + m_{COONa}}{m_s \times 1000} \times 100\%$$

in which m$_s$—weight of the test sample, unit: g.

6) If the super absorbent resin is known to have a degree of neutralization, the extractable content w expressed in percent by weight is calculated by a formula below:

$$w = \frac{(V_{HCl,s} - V_{HCl,b})C_{HCl} \times M_{acr} \times F_{dil}}{m_s \times 1000} \times 100\%$$

in which $V_{HCl,s}$—volume (unit: mL) of the hydrochloric acid solution needed for titrating the sample filtrate from pH 10 to pH 2.7;

$V_{HCl,b}$—volume (unit: mL) of the hydrochloric acid solution needed for titrating the blank solution from pH 10 to pH 2.7;

$C_{HCl}$—concentration (unit: mol/L) of the hydrochloric acid solution;

m$_{acr}$—molar mass of acrylate (87.46 g/mol);

m$_s$—mass of the sample, unit: g.

Two measurements are performed at the same time, and the arithmetic average is taken as the measurement result. The result is rounded off to one decimal place.

Example 1

A method for preparing a super absorbent resin is provided, which comprises the following steps.

1) Acrylic acid (300 g) was formulated into a 25 wt % aqueous solution, cooled to −3-2° C., and slowly poured into a 2000 ml glass beaker wound with a heat insulation layer on the outer surface. The beaker was sealed with a plastic wrap, into which a nitrogen tube, and a thermometer were inserted.

2) Trimethylolpropane triacrylate (0.616 g), a solution containing 2-azobis(2-methylpropylamidine) dihydrochloride (0.110 g), and a solution containing sucrose fatty acid ester (0.03 g) were injected into the beaker respectively by using a syringe, and deoxygenated by bubbling nitrogen therethrough at 5 ml/min while stirring.

3) After 15 min, an aqueous solution containing sodium persulfate (0.6 g), an aqueous solution containing ascorbic acid/ferrous chloride (0.05 g), and a 48.5% aqueous sodium hydroxide solution (17.210 g) were respectively injected, and nitrogen was continuously bubbled therethrough for another 2 min while stirring. Several minutes later, the free radical polymerization was initiated and incubated for eight hours.

4) The gel obtained after reaction was cut into thin strips, sprayed with a 30% aqueous sodium carbonate solution (302 g) preheated to 45° C. or above, and broken, neutralized and granulated in a small neutralization extrusion granulator.

5) The granules were dried to a constant weight at a temperature ranging from 150 to 200° C. and then pulverized. Particles of 100-125 meshes were sieved by using a standard sieve, and formulated according to a fixed particle size combination, to obtain powdered raw super absorbent resin particles.

6) The raw super absorbent resin particles (100 g) were weighed. Propylene glycol:ethylene glycol diglycidyl ether: water at a ratio of 1.600 g:0.090 g:3.470 g were sprayed, uniformly mixed with the raw particles, and heated for 30 min at a temperature of 135° C.

7) The material was sprayed with a 15% solution of aluminium sodium sulfate (2.46 g) in water and uniformly mixed. Then, fumed silica (0.36 g) was added and heated for 2 min at a temperature of 135° C., to obtain a high-performance super absorbent resin.

8) Steps 6) and 7) were repeated to obtain a super absorbent resin (about 410 g).

Example 2

A method for preparing a super absorbent resin is provided, which comprises the following steps.

1) Acrylic acid (300 g) was formulated into a 30 wt % aqueous solution, cooled to −3-2° C., and slowly poured into a 2000 ml glass beaker wound with a heat insulation layer on the outer surface. The beaker was sealed with a plastic wrap, into which a nitrogen tube, and a thermometer were inserted.

2) Pentaerythrityl triallyl ether (0.958 g), a solution of 2,2'-(1,2-diazenediyl)bis[N-(2-hydroxyethyl)-2-methylpropionamide (0.117 g) in water, and a solution containing linear sodium dodecylbenzenesulfonate (0.03 g) were injected into the beaker respectively by using a syringe, and deoxygenated by bubbling nitrogen therethrough at 5 ml/min while stirring.

3) After 15 min, hydrogen peroxide (0.02 g), an aqueous solution containing ascorbic acid and ferrous chloride (0.09 g), and a 48.5% aqueous sodium hydroxide solution (17.210 g) were respectively injected, and nitrogen was continuously bubbled therethrough for another 2 min while stirring. Several minutes later, the free radical polymerization was initiated and incubated for eight hours.

4) The gel obtained after reaction was cut into thin strips, sprayed with a 48.5% aqueous sodium hydroxide solution (238.5 g), and broken, neutralized and granulated in a small neutralization extrusion granulator.

5) The granules were dried to a constant weight at a temperature ranging from 150 to 200° C. and then pulverized. Particles of 100-125 meshes were sieved by using a standard sieve, and formulated according to a fixed particle size combination, to obtain powdered raw super absorbent resin particles.

6) The raw super absorbent resin particles (100 g) were weighed. Propylene glycol:ethylene glycol diglycidyl ether: water at a ratio of 1.560 g:0.090 g:3.470 g were sprayed, uniformly mixed with the raw particles, and heated for 30 min at a temperature of 135° C.

7) The material was sprayed with a 15% solution of aluminium sodium sulfate (2.46 g) in water and uniformly mixed. Then, fumed silica (0.36 g) was added and heated for 5 min at a temperature of 135° C., to obtain a high-performance super absorbent resin.

8) Steps 6) and 7) were repeated to obtain a super absorbent resin (about 410 g).

Example 3

A method for preparing a super absorbent resin is provided, which comprises the following steps.

1) Acrylic acid (300 g) was formulated into a 35 wt % aqueous solution, cooled to −3-2° C., and slowly poured into a 2000 ml glass beaker wound with a heat insulation layer on the outer surface. The beaker was sealed with a plastic wrap, into which a nitrogen tube, and a thermometer were inserted.

2) N,N,-methylene-bisacrylamide (0.071 g), acrylamide (0.071 g), a solution of 2,2'-(1,2-diazenediyl)bis[N-(2-hydroxyethyl)-2-methylpropionamide (0.117 g) in water, and a solution of linear sodium dodecylbenzenesulfonate (0.03 g)

in water were injected into the beaker respectively by using a syringe, and nitrogen was bubbled therethrough.

3) After 15 min, hydrogen peroxide (0.02 g), an aqueous solution containing ascorbic acid and ferrous chloride (0.09 g), and a 48.5% aqueous sodium hydroxide solution (17.210 g) were respectively injected, and nitrogen was continuously bubbled therethrough for another 2 min while stirring. Several minutes later, the free radical polymerization was initiated and incubated for eight hours.

4) The gel obtained after reaction was cut into thin strips, sprayed with a 48.5% aqueous sodium hydroxide solution (238.5 g), and broken, neutralized and granulated in a small neutralization extrusion granulator.

5) The granules were dried to a constant weight at a temperature ranging from 150 to 200° C. and then pulverized. Particles of 100-125 meshes were sieved by using a standard sieve, and formulated according to a fixed particle size combination, to obtain powdered raw super absorbent resin particles.

6) The raw super absorbent resin particles (100 g) were weighed. Propylene glycol:ethylene glycol diglycidyl ether:water at a ratio of 1.600 g:0.090 g:3.470 g were sprayed, uniformly mixed with the raw particles, and heated for 30 min at a temperature of 135° C.

7) The material was sprayed with a 15% solution of aluminium sodium sulfate (2.46 g) in water and uniformly mixed. Then, magnesia (0.15 g) and fumed silica (0.26 g) was added and heated for 2 min at a temperature of 135° C., to obtain a high-performance super absorbent resin.

8) Steps 6) and 7) were repeated to obtain a super absorbent resin (about 410 g).

Example 4

A method for preparing a super absorbent resin is provided, which comprises the following steps.

1) Acrylic acid (300 g) was formulated into a 25 wt % aqueous solution, cooled to −3-2° C., and slowly poured into a 2000 ml glass beaker wound with a heat insulation layer on the outer surface. The beaker was sealed with a plastic wrap, into which a nitrogen tube, and a thermometer were inserted.

2) Trimethylolpropane triacrylate (0.616 g), a solution containing 2-azobis(2-methylpropylamidine) dihydrochloride (0.110 g), and a solution containing straight-chain sodium fatty alcohol polyoxyethylene ether sulphate (0.03 g) were injected into the beaker respectively by using a syringe, and deoxygenated by bubbling nitrogen therethrough at 5 ml/min while stirring.

3) After 15 min, a solution of sodium persulfate (0.6 g) in water, and a solution of ascorbic acid/ferrous chloride (0.05 g) in water were respectively injected, and nitrogen was continuously bubbled therethrough for another 2 min while stirring. Several minutes later, the free radical polymerization was initiated and incubated for eight hours.

4) The gel obtained after reaction was cut into thin strips, sprayed with a 48.5% aqueous sodium hydroxide solution (255.7 g), and broken, neutralized and granulated in a small neutralization extrusion granulator.

5) The granules were dried to a constant weight at a temperature ranging from 150 to 200° C. and then pulverized. Particles of 100-125 meshes were sieved by using a standard sieve, and formulated according to a fixed particle size combination, to obtain powdered raw super absorbent resin particles.

6) The raw super absorbent resin particles (100 g) were weighed. 1,4-butylene glycol:ethylene glycol diglycidyl ether:water at a ratio of 1.912 g:0.090 g:3.470 g were sprayed, uniformly mixed with the raw particles, and heated for 30 min at a temperature of 135° C.

7) The material was sprayed with a 15% solution of aluminium sodium sulfate (2.46 g) in water and uniformly mixed. Then, fumed silica (0.36 g) was added and heated for 2 min at a temperature of 135° C., to obtain a high-performance super absorbent resin.

8) Steps 6) and 7) were repeated to obtain a super absorbent resin (about 410 g).

Example 5

A method for preparing a super absorbent resin is provided, which comprises the following steps.

1) Acrylic acid (300 g) was formulated into a 31 wt % aqueous solution, cooled to −3-2° C., and slowly poured into a 2000 ml glass beaker wound with a heat insulation layer on the outer surface. The beaker was sealed with a plastic wrap, into which a nitrogen tube, and a thermometer were inserted.

2) Pentaerythrityl triallyl ether (0.958 g), and a solution of 2,2'-(1,2-diazenediyl)bis[N-(2-hydroxyethyl)-2-methylpropionamide (0.117 g) in water were injected respectively by using a syringe, and deoxygenated by bubbling nitrogen therethrough at 5 ml/min while stirring.

3) After 15 min, hydrogen peroxide (0.02 g), and a solution of ascorbic acid and ferrous chloride (0.09 g) in water were respectively injected, and nitrogen was continuously bubbled therethrough for another 2 min while stirring. Several minutes later, the free radical polymerization was initiated and incubated for eight hours.

4) The gel obtained after reaction was cut into thin strips, sprayed with a 30% aqueous sodium carbonate solution (547 g) preheated to 45° C. or above, and broken, neutralized and granulated in a small neutralization extrusion granulator.

5) The granules were dried for 2 hrs at a temperature ranging from 150 to 200° C. and then pulverized. Particles of 100-125 meshes were sieved by using a standard sieve, and formulated according to a fixed particle size combination, to obtain powdered raw super absorbent resin particles.

6) The raw super absorbent resin particles (100 g) were weighed. Propylene glycol:neopentyl glycol polydiglycidyl ether:water at a ratio of 1.600 g:0.123 g:3.470 g were sprayed, uniformly mixed with the raw particles, and heated for 25 min at a temperature of 145° C.

7) The material was sprayed with a 15% solution of aluminium sodium sulfate (2.46 g) in water and uniformly mixed. Then, fumed silica (0.36 g) was added and heated for 2 min at a temperature of 135° C., to obtain a high-performance super absorbent resin.

8) Steps 6) and 7) were repeated to obtain a super absorbent resin (about 410 g).

Example 6

A method for preparing a super absorbent resin is provided, which comprises the following steps.

1) Acrylic acid (300 g) was formulated into a 35 wt % aqueous solution, cooled to −3-2° C., and slowly poured into a 2000 ml glass beaker wound with a heat insulation layer on the outer surface. The beaker was sealed with a plastic wrap, into which a nitrogen tube, and a thermometer were inserted.

2) N,N,-methylene-bisacrylamide (0.071 g), acrylamide (0.071 g), and a solution of 2,2'-(1,2-diazenediyl)bis[N-(2-hydroxyethyl)-2-methylpropionamide (0.117 g) in water were injected into the beaker respectively by using a syringe, and nitrogen was bubbled therethrough.

3) After 15 min, hydrogen peroxide (0.02 g), an aqueous solution containing ascorbic acid and ferrous chloride (0.09 g), and a 48.5% aqueous sodium hydroxide solution (17.210 g) were respectively injected, and nitrogen was continuously bubbled therethrough for another 2 min while stirring. Several minutes later, the free radical polymerization was initiated and reacted for eight hours.

4) The gel obtained after reaction was cut into thin strips, sprayed with a 48.5% aqueous sodium hydroxide solution (255.7 g), and broken, neutralized and granulated in a small neutralization extrusion granulator.

5) The granules were dried to a constant weight at a temperature ranging from 150 to 200° C. and then pulverized. Particles of 100-125 meshes were sieved by using a standard sieve, and formulated according to a fixed particle size combination, to obtain powdered raw super absorbent resin particles.

6) The raw super absorbent resin particles (100 g) were weighed. Propylene glycol:ethylene glycol diglycidyl ether:water at a ratio of 1.600 g:0.090 g:3.470 g were sprayed, uniformly mixed with the raw particles, and heated for 30 min at a temperature of 135° C.

7) The material was sprayed with a 15% solution of aluminium sodium sulfate (2.46 g) in water and uniformly mixed. Then, fumed silica (0.36 g) was added and heated for 2 min at a temperature of 135° C., to obtain a high-performance super absorbent resin.

8) Steps 6) and 7) were repeated to obtain a super absorbent resin (about 410 g).

Example 7

A method for preparing a super absorbent resin is provided, which comprises the following steps.

1) Acrylic acid (300 g) was formulated into a 25 wt % aqueous solution, cooled to −3-2° C., and slowly poured into a 2000 ml glass beaker wound with a heat insulation layer on the outer surface. The beaker was sealed with a plastic wrap, into which a nitrogen tube, and a thermometer were inserted.

2) Trimethylolpropane triacrylate (0.616 g), a solution containing 2-azobis(2-methylpropylamidine) dihydrochloride (0.110 g), and a solution containing sucrose fatty acid ester (0.03 g) were injected into the beaker respectively by using a syringe, and deoxygenated by bubbling nitrogen therethrough at 5 ml/min while stirring.

3) After 15 min, an aqueous solution containing sodium persulfate (0.6 g), an aqueous solution containing ascorbic acid/ferrous chloride (0.05 g), and a 48.5% aqueous sodium hydroxide solution (17.210 g) were respectively injected, and nitrogen was continuously bubbled therethrough for another 2 min while stirring. Several minutes later, the free radical polymerization was initiated and incubated for eight hours.

4) The gel obtained after reaction was cut into thin strips, sprayed with a 48.5% aqueous sodium hydroxide solution (238.5 g), and broken, neutralized and granulated in a small neutralization extrusion granulator.

5) The granules were dried to a constant weight at a temperature ranging from 150 to 200° C. and then pulverized. Particles of 100-125 meshes were sieved by using a standard sieve, and formulated according to a fixed particle size combination, to obtain powdered raw super absorbent resin particles.

6) The raw super absorbent resin particles (100 g) were weighed. Propylene glycol:ethylene glycol diglycidyl ether:water at a ratio of 1.600 g:0.090 g:3.470 g were sprayed, uniformly mixed with the raw particles, and heated for 30 min at a temperature of 135° C.

7) The material was sprayed with a 15% solution of aluminium sodium sulfate (2.46 g) in water and uniformly mixed. Then, fumed silica (0.36 g) was added and heated for 2 min at a temperature of 135° C., to obtain a high-performance super absorbent resin.

8) Steps 6) and 7) were repeated to obtain a super absorbent resin (about 410 g).

Example 8

A method for preparing a super absorbent resin is provided, which comprises the following steps.

1) Acrylic acid (300 g) was formulated into a 30 wt % aqueous solution, cooled to −3-2° C., and slowly poured into a 2000 ml glass beaker wound with a heat insulation layer on the outer surface. The beaker was sealed with a plastic wrap, into which a nitrogen tube, and a thermometer were inserted.

2) Pentaerythrityl triallyl ether (0.958 g), and a solution of 2,2'-(1,2-diazenediyl)bis[N-(2-hydroxyethyl)-2-methylpropionamide (0.117 g) in water were injected respectively by using a syringe, and deoxygenated by bubbling nitrogen therethrough at 5 ml/min while stirring.

3) After 15 min, hydrogen peroxide (0.02 g), an aqueous solution containing ascorbic acid and ferrous chloride (0.09 g), and a 48.5% aqueous sodium hydroxide solution (17.210 g) were respectively injected, and nitrogen was continuously bubbled therethrough for another 2 min while stirring. Several minutes later, the free radical polymerization was initiated and reacted for eight hours.

4) The gel obtained after reaction was cut into thin strips, sprayed with a 48.5% aqueous sodium hydroxide solution (238.5 g), and broken, neutralized and granulated in a small neutralization extrusion granulator.

5) The granules were dried to a constant weight at a temperature ranging from 150 to −200° C. and then pulverized. Particles of 100-125 meshes were sieved by using a standard sieve, and formulated according to a fixed particle size combination, to obtain powdered raw super absorbent resin particles.

6) The raw super absorbent resin particles (100 g) were weighed. Propylene glycol:ethylene glycol diglycidyl ether:water at a ratio of 0.525 g:0.090 g:1.485 g were sprayed, uniformly mixed with the raw particles, and heated for 30 min at a temperature of 135° C.

7) The material was sprayed with a 15% solution of aluminium sodium sulfate (2.25 g) in water and uniformly mixed. Then, fumed silica (0.25 g) was added and heated for 5 min at a temperature of 130° C., to obtain a high-performance super absorbent resin.

8) Steps 6) and 7) were repeated to obtain a super absorbent resin (about 410 g).

Example 9

A method for preparing a super absorbent resin is provided, which comprises the following steps.

1) Acrylic acid (300 g) was formulated into a 35 wt % aqueous solution, cooled to −3-2° C., and slowly poured into a 2000 ml glass beaker wound with a heat insulation layer on the outer surface. The beaker was sealed with a plastic wrap, into which a nitrogen tube, and a thermometer were inserted.

2) N,N,-methylene-bisacrylamide (0.071 g), acrylamide (0.071 g), and a solution of 2,2'-(1,2-diazenediyl)bis[N-(2-hydroxyethyl)-2-methylpropionamide (0.117 g) in water were injected into the beaker respectively by using a syringe, and nitrogen was bubbled therethrough.

3) After 15 min, hydrogen peroxide (0.02 g), an aqueous solution containing ascorbic acid and ferrous chloride (0.09 g), and a 48.5% aqueous sodium hydroxide solution (17.210 g) were respectively injected, and nitrogen was continuously bubbled therethrough for another 2 min while stirring. Several minutes later, the free radical polymerization was initiated and reacted for eight hours.

4) The gel obtained after reaction was cut into thin strips, sprayed with a 48.5% aqueous sodium hydroxide solution (255.7 g), and broken, neutralized and granulated in a small neutralization extrusion granulator.

5) The granules were dried to a constant weight at a temperature ranging from 150 to 200° C. and then pulverized. Particles of 100-125 meshes were sieved by using a standard sieve, and formulated according to a fixed particle size combination, to obtain powdered raw super absorbent resin particles.

6) The raw super absorbent resin particles (100 g) were weighed. Propylene glycol:ethylene glycol diglycidyl ether: water at a ratio of 1.600 g:0.090 g:3.470 g were sprayed, uniformly mixed with the raw particles, and heated for 30 min at a temperature of 135° C.

7) The material was sprayed with a 15% solution of aluminium sodium sulfate (2.46 g) in water and uniformly mixed. Then, fumed silica (0.36 g) was added and heated for 2 min at a temperature of 135° C., to obtain a high-performance super absorbent resin.

8) Steps 6) and 7) were repeated to obtain a super absorbent resin (about 410 g).

Examples 10-12

The preparation method in these examples was the same as that in Example 1, except that methacrylic acid, maleic acid, and fumaric acid monomer were respectively used to replace the acrylic acid monomer, and cooled to −3-5° C.

Examples 13-14

The preparation method in these examples was the same as that in Example 1, except that in Step 5), the drying temperature was 130-140° C. and 200° C.–300° C. respectively.

Example 15

The preparation method in these examples was the same as that in Example 1, except that in Step 6), sorbitol polyglycidyl ether was used to replace ethylene glycol diglycidyl ether, and heated for 40 min at a temperature of 90-100° C.

Example 16

The preparation method in these examples was the same as that in Example 1, except that in Step 6), diglycerol polyglycidyl ether was used to replace ethylene glycol diglycidyl ether, and heated for 10 min at a temperature of 170-180° C.

Example 17

The preparation method in these examples was the same as that in Example 1, except that in Step 6), ethylenediamine was used to replace ethylene glycol diglycidyl ether.

Figure 2:
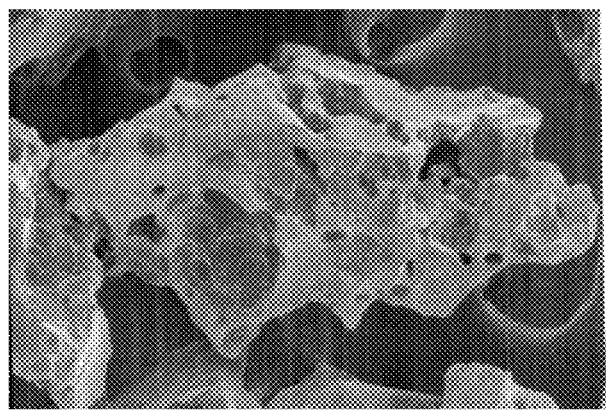
FIGS. 2 and 3 are photographs of the super absorbent resins according to the present invention under a high power microscope.
Figure 3:
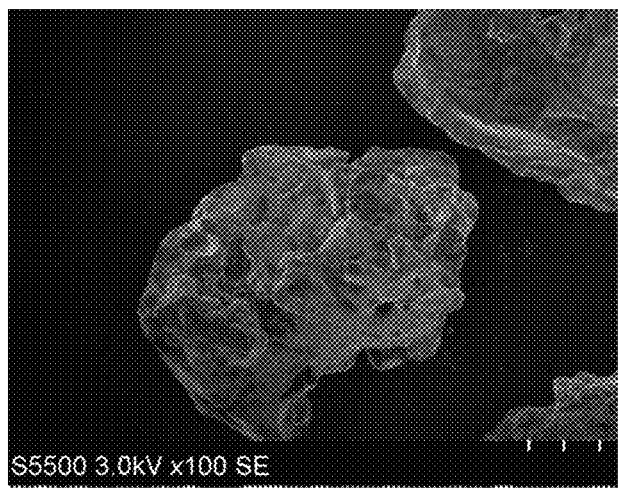

FIG. 1 is a photograph of an existing super absorbent resin having a solid structure under a high power microscope. FIGS. 2 and 3 are photographs of the super absorbent resins having a porous structure according to the present invention under a high power microscope. The performance test results of the super absorbent resin according to the present invention are shown in Tables 1-4.

TABLE 1

Test results of absorption capacity, water retention capacity and pressure resistance.

| Sample | Absorption capacity Absorbency Pure water g/g | Absorption capacity Absorbency 0.9% saline g/g | Water retention capacity Water retention capacity after centrifugation 0.9% saline at 150G g/g | Pressure resistance Absorbency under pressure (0.9% saline) 0.6 psi: g/g | Pressure resistance Absorbency under pressure (0.9% saline) 0.9 psi: g/g |
|---|---|---|---|---|---|
| Example 1 | 620 | 67.3 | 42.2 | 14.5 | 10.3 |
| Example 2 | 438 | 60.1 | 36.2 | 22.2 | 16.8 |
| Example 3 | 415 | 58.0 | 33.8 | 23.5 | 17.1 |
| Example 4 | 643 | 67.9 | 42.7 | 14.1 | 11.4 |
| Example 5 | 450 | 60.8 | 33.5 | 24.8 | 17.7 |
| Example 6 | 430 | 58.5 | 34.3 | 24.6 | 18.1 |
| Example 7 | 679 | 69.2 | 44.8 | 13.3 | 9.8 |
| Example 8 | 470 | 67.7 | 42.6 | 15.0 | 10.4 |
| Example 9 | 455 | 59.7 | 34.7 | 23.7 | 16.4 |
| Existing product | 430 | 56.5 | 35.3 | 26.6 | 19.2 |

TABLE 2

Test results of liquid absorption rate, liquid diffusivity, and bulk density

| Sample | Liquid absorption rate Absorption capacity within a fixed time interval (pure water) 1 min g/g | Liquid absorption rate Absorption capacity within a fixed time interval (pure water) 3 min g/g | Liquid absorption rate Absorption capacity within a fixed time interval (pure water) 5 min g/g | Absorption capacity within a fixed time interval (0.9% saline) 1 min g/g | Absorption capacity within a fixed time interval (0.9% saline) 3 min g/g | Absorption capacity within a fixed time interval (0.9% saline) 5 min g/g | Absorption rate Static method s | Absorption rate Vortex method s | Liquid diffusivity Flow-through rate ml/min | Bulk density Apparent density g/ml |
|---|---|---|---|---|---|---|---|---|---|---|
| Example 1 | 189 | 321 | 397 | 31 | 49 | 56 | 24/48 | 26 | 18 | 0.62 |
| Example 2 | 210 | 370 | 428 | 34 | 50 | 55 | 25/48 | 26 | 55 | 0.59 |
| Example 3 | 203 | 353 | 410 | 33 | 48 | 54 | 26/49 | 27 | 89 | 0.60 |
| Example 4 | 207 | 334 | 408 | 32 | 49 | 57 | 24/49 | 27 | 26 | 0.61 |

TABLE 2-continued

Test results of liquid absorption rate, liquid diffusivity, and bulk density

| Sample | Liquid absorption rate Absorption capacity within a fixed time interval (pure water) | | | Absorption capacity within a fixed time interval (0.9% saline) | | | Absorption rate | | Liquid diffusivity | Bulk density |
|---|---|---|---|---|---|---|---|---|---|---|
| | 1 min g/g | 3 min g/g | 5 min g/g | 1 min g/g | 3 min g/g | 5 min g/g | Static method s | Vortex method s | Flow-through rate ml/min | Apparent density g/ml |
| Example 5 | 201 | 341 | 397 | 33 | 49 | 54 | 24/49 | 24 | 86 | 0.60 |
| Example 6 | 207 | 346 | 406 | 32 | 48 | 53 | 26/50 | 28 | 93 | 0.60 |
| Example 7 | 214 | 354 | 420 | 33 | 51 | 55 | 23/47 | 25 | 12 | 0.60 |
| Example 8 | 227 | 431 | 459 | 35 | 51 | 57 | 25/47 | 23 | 17 | 0.59 |
| Example 9 | 213 | 359 | 412 | 34 | 50 | 55 | 26/49 | 25 | 9 | 0.59 |
| Existing product | 63 | 160 | 226 | 17 | 31 | 39 | 66/133 | 61 | 14.6 | 0.66 |

TABLE 3

Test results of particle size, particle size distribution, and hydrolysis resistance

| Sample | Average particle size μm | Particle size distribution | | | | | Hydrolysis resistance Extractable content % |
|---|---|---|---|---|---|---|---|
| | | >25 meshes % | 25-35 meshes % | 35-50 meshes % | 50-100 meshes % | <100 meshes % | |
| Example 1 | 444 | 0.6 | 38.0 | 49.1 | 11.9 | 0.4 | 5.22 |
| Example 2 | 404 | 0.1 | 21.1 | 59.5 | 19.0 | 0.3 | 3.12 |
| Example 3 | 402 | 0.6 | 25.0 | 52.0 | 21.2 | 1.1 | 4.82 |
| Example 4 | 403 | 0.7 | 26.4 | 50.2 | 16.3 | 0.4 | 4.92 |
| Example 5 | 396 | 0.5 | 25.7 | 52.1 | 20.3 | 1.5 | 2.35 |
| Example 6 | 405 | 4.2 | 41.2 | 39.2 | 15.1 | 0.1 | 4.07 |
| Example 7 | 406 | 3.7 | 44.5 | 40.3 | 11.4 | 0.1 | 5.42 |
| Example 8 | 407 | 0.3 | 34.3 | 52.4 | 12.2 | 0.6 | 3.67 |
| Example 9 | 407 | 0.3 | 34.3 | 52.4 | 12.2 | 0.6 | 5.37 |
| Existing product | 405 | 4.2 | 41.2 | 39.2 | 15.1 | 0.1 | 17.84 |

TABLE 4

Test results of reverse osmosis of liquid absorbed

| Sample | Reverse osmosis of liquid absorbed Quantity of reverse osmosis | | | | |
|---|---|---|---|---|---|
| | 1 hr g | 4 hrs g | 8 hrs g | 16 hrs g | 24 hrs g |
| Example 1 | 0.84 | 1.76 | 2.01 | 2.73 | 3.12 |
| Example 2 | 0.82 | 1.82 | 2.19 | 2.81 | 3.09 |
| Example 3 | 0.91 | 1.94 | 2.31 | 3.01 | 3.12 |
| Example 4 | 0.82 | 1.81 | 2.14 | 2.87 | 3.26 |
| Example 5 | 0.77 | 1.61 | 2.17 | 2.52 | 2.64 |
| Example 6 | 0.89 | 1.91 | 2.28 | 3.05 | 3.17 |
| Example 7 | 1.02 | 2.13 | 2.74 | 3.21 | 4.11 |
| Example 8 | 0.93 | 1.83 | 2.23 | 2.91 | 3.32 |
| Example 9 | 0.92 | 2.01 | 2.35 | 3.44 | 4.83 |
| Existing product | 0.97 | 2.25 | 4.28 | 5.46 | 5.92 |

Through various tests, it has been confirmed that the super absorbent resin of the present invention has excellent physical properties and can be used in agricultural and forestry soil water retention agents, as water absorbents in hygiene products such as diapers, adult incontinence products and feminine hygiene products, and in preservation applications for food preservation.

Obviously, the above examples are merely provided for elucidating the present invention, and not intended to limit the implementations of the present invention. Other variations or changes in various forms can be made by those skilled in the art based on the above description, which are not enumerated herein. Any obvious changes or variations derived from the technical solutions of the present invention are still within the protection scope of the present invention.

What is claimed is:

1. A method for preparing a super absorbent resin, comprising:

step 1) adding an inner-crosslinking agent, an active promoter, and an initiator to a solution of an unsaturated monomer in water to obtain a mixture solution, deoxygenating the mixture solution by bubbling nitrogen therethrough, and subjecting the mixture solution to a free radical polymerization to obtain a gel, wherein the active promoter is one selected from the group consisting of a fatty acid ester, a fatty acid salt, an alkyl sulfonate salt, and a mixture of the fatty acid ester, the fatty acid salt, and the alkyl sulfonate salt;

the free radical polymerization is initiated at a temperature ranging from −3° C. to 5° C.;

the initiator is a mixture of a redox initiator and a thermally decomposable initiator, wherein the redox initiator is a combination of ascorbic acid and ferrous chloride; and the thermally decomposable initiator is one selected from the group consisting of hydrogen peroxide, phthalimide peroxide, a persulfate, an ammonium persulfate, an alkali metal persulfate, 2,2'-azobis (2-amidinopropane) dihydrochloride, 2,2'-azodiisobutylamidine dihydrochloride, 2,2'-azobis(N,N'-dimethyleneisobutylamidine) dihydrochloride, and 2,2-azo[2-methyl-N-(2-hydroxyethyl)]propenamine;

the unsaturated monomer is acrylic acid, methacrylic acid, maleic acid, or fumaric acid;

step 2) reacting the gel with a neutralizing agent to obtain an intermediate product; extruding and granulating the intermediate product to obtain a product;

step 3) drying, pulverizing, sieving, and fixing a particle size distribution after the sieving to obtain a plurality of powdered raw particles, wherein the particle size distribution after sieving is 100-800 μm; an average particle size of the powdered raw particles obtained after fixing the particle size distribution is 300-450 μm; and the bulk density is 0.55-0.63 g/mL, step 4) adding a surface crosslinking agent to the plurality of powdered raw particles and performing surface crosslinking by heating to obtain a plurality of crosslinked particles; and step 5) subjecting the plurality of crosslinked particles to an anti-caking treatment, wherein the anti-caking treatment comprises adding an aqueous solution of aluminum sodium sulfate to the plurality of crosslinked particles to obtain a mixed particle, and then adding fumed silica to the mixed particle and heating, to obtain a super absorbent resin.

2. The method for preparing a super absorbent resin according to claim 1, wherein the inner-crosslinking agent is a compound having two or more unsaturated double bonds and/or a compound having two or more epoxy groups.

3. The method for preparing a super absorbent resin according to claim 1, wherein, the unsaturated monomer is the acrylic acid and in step 1), a neutralizing agent is further added; and the neutralizing agent is added in an amount of 0-5 mol % based on exclusively the acrylic acid in a solution of the acrylic acid in water.

4. The method for preparing a super absorbent resin according to claim 1, wherein the neutralizing agent is an alkali metal hydroxide or carbonate.

5. The method for preparing a super absorbent resin according to claim 1, wherein the surface crosslinking agent is one of a compound having two or more epoxy groups, a polyol, a polyamine, or a mixture thereof.

6. The method for preparing a super absorbent resin according to claim 1, wherein the particle size distribution after sieving is 150-710 μm.

* * * * *